United States Patent
Bracegirdle

(10) Patent No.: US 7,875,231 B1
(45) Date of Patent: Jan. 25, 2011

(54) METHOD FOR PRODUCING FIBER REINFORCED CEMENT-BASED STRUCTURAL BUILDING MATERIALS

(76) Inventor: Paul E. Bracegirdle, 9 Crimson Leaf Dr., Newtown, PA (US) 18940

( * ) Notice: Subject to any disclaimer, the term of this patent is extended or adjusted under 35 U.S.C. 154(b) by 107 days.

(21) Appl. No.: 12/037,349

(22) Filed: Feb. 26, 2008

Related U.S. Application Data

(60) Provisional application No. 60/903,343, filed on Feb. 26, 2007.

(51) Int. Cl.
  *B28B 1/00* (2006.01)
  *B28B 3/00* (2006.01)
  *B28B 23/02* (2006.01)
(52) U.S. Cl. .............. 264/333; 264/DIG. 43
(58) Field of Classification Search .............. None
  See application file for complete search history.

(56) References Cited

U.S. PATENT DOCUMENTS

| | | | |
|---|---|---|---|
| 4,504,318 A * | 3/1985 | Matsuda et al. | 524/5 |
| 5,524,412 A * | 6/1996 | Corl | 52/745.19 |
| 6,506,248 B1 * | 1/2003 | Duselis et al. | 106/713 |
| 6,629,392 B1 * | 10/2003 | Harrel et al. | 52/481.1 |
| 6,676,862 B2 * | 1/2004 | Jensen | 264/39 |
| 6,872,246 B2 * | 3/2005 | Merkley et al. | 106/805 |
| 2003/0089061 A1 * | 5/2003 | DeFord et al. | 52/309.9 |
| 2008/0141908 A1 * | 6/2008 | Peng et al. | 106/713 |

* cited by examiner

*Primary Examiner*—Edmund H. Lee
(74) *Attorney, Agent, or Firm*—LaMorte & Associates

(57) ABSTRACT

A composition for synthetic structural building materials, such as lumber, and the method used to fabricate such building materials. The synthetic building materials are molded from a composition that contains cement, sand, curing agents, water, synthetic fibers, a low density particulate and a curable polymer. These ingredients and a few others are mixed in unique ratios to produce a synthetic material that mimics the strength, flexibility, and weight of natural wood. The composition cures with time. Prior to curing, the composition is molded into the form of structural building materials, such as framing lumber and planks. Depending upon the intended purpose of the building materials, the composition can be molded around reinforcement elements that internally strengthen the composition when it is cured. The final piece of structural building material has a weight, strength and flexibility comparable to wood, yet is resistant to rot and insects.

19 Claims, 2 Drawing Sheets

METHOD FOR PRODUCING FIBER REINFORCED CEMENT-BASED STRUCTURAL BUILDING MATERIALS

RELATED APPLICATIONS

This application claims priority of U.S. Provisional Patent Application No. 60/903,343, filed Feb. 26, 2007 now abandoned.

BACKGROUND OF THE INVENTION

1. Field of the Invention

In general, the present invention relates to synthetic building materials that can be used in place of traditional lumber and wood products. More specifically, the present invention relates to the cement-based compositions that can be formed into synthetic lumber and the method of forming such compositions into commercial products.

2. Prior Art Description

Wood has been used as a building material throughout human history. Wood is a nearly perfect building material. It is lightweight, strong and flexible. Wood can be cut, carved and sanded into almost any shape using only simple handheld tools. Furthermore, in the past, wood has been both plentiful and inexpensive. However, as forests retreat, wood is becoming increasingly more expensive. Additionally, the quality of wood has been decreasing as younger trees have been forested to meet the world's demand for wood products.

Although wood is a highly versatile building material, it does have some disadvantages. Wood, being an organic material, is vulnerable to rot, insect damage and degradation from both the elements and a host of microorganisms. Accordingly, wood must be treated and/or painted, especially if it is left exposed to the elements. Additionally, although wood has an average strength, no two pieces of wood have the same properties. The strength, flexibility, density and even appearance of a piece of wood depends largely upon the type of tree from which the wood came, the part of the tree from where it was cut, the direction of grain in the wood, and the number of knots and other imperfections that are present in the wood.

In an attempt to make building materials that are more uniform and more resistant to the elements, synthetic compositions have been used in place of wood. Many traditionally wooden products, such as deck railings, are now made from synthetic materials. The synthetic compositions used to make traditional wood building products vary. If the building product is ornamental, it may be molded from plastic. However, if the building product must withstand static or dynamic loading, the building product is typically made by mixing either cement or plastic with a binder, such as cellulose or fiberglass. Synthetic building products made from such compositions are typically much more resistant to rot and insects than is natural wood. Furthermore, such synthetic building products are also far more uniform in strength, flexibility, density and appearance from piece to piece. However, such synthetic building products are typically much heavier, less flexible, more brittle and weaker in tension than are natural wood products. Furthermore, many types of synthetic building materials cannot be cut using traditional woodworking tools. Such synthetic building materials also tend to be more expensive than those made from natural wood. Accordingly, many synthetic building products have not found wide acceptance in the marketplace.

A need exists for a new composition for synthetic building materials that more closely mirrors the strength, flexibility and tensile strength of wood, while still providing better resistance to weathering and insects. A need also exists for a composition for synthetic building materials that can be manufactured inexpensively so as to compete with natural wood products. These needs are met by the present invention as described and claimed below.

SUMMARY OF THE INVENTION

The present invention is the composition of synthetic structural building materials, such as lumber, and the method used to fabricate such building materials. The synthetic building materials are molded from a composition that contains cement, sand, curing agents, water, synthetic fibers, a low density particulate, and a curable polymer. These ingredients and a few others are mixed in unique ratios to produce a synthetic material that mimics the strength, flexibility, and weight of natural wood.

The composition cures with time. Prior to curing, the composition is molded into the form of structural building materials, such as framing lumber and planks. Depending upon the intended purpose of the building materials, the composition can be molded around reinforcement elements that internally strengthen the composition when it is cured. The final piece of structural building material has a weight, strength and flexibility comparable to wood, yet is synthetic and is resistant to rot and insects.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention can be used to make a variety of building materials, such as sheathing and engineered beams, the present invention is especially well suited for use in making building materials, such as deck planks and framing members, that are exposed to the elements. Accordingly, the exemplary embodiment of the invention illustrates and describes processes being used to make planks or framing members of synthetic lumber that can be used in making decks and boardwalks. Such an exemplary embodiment is selected to set forth one of the best modes contemplated for the invention. However, the use of such an exemplary embodiment should not be considered a limitation on the invention.

Figure 1:
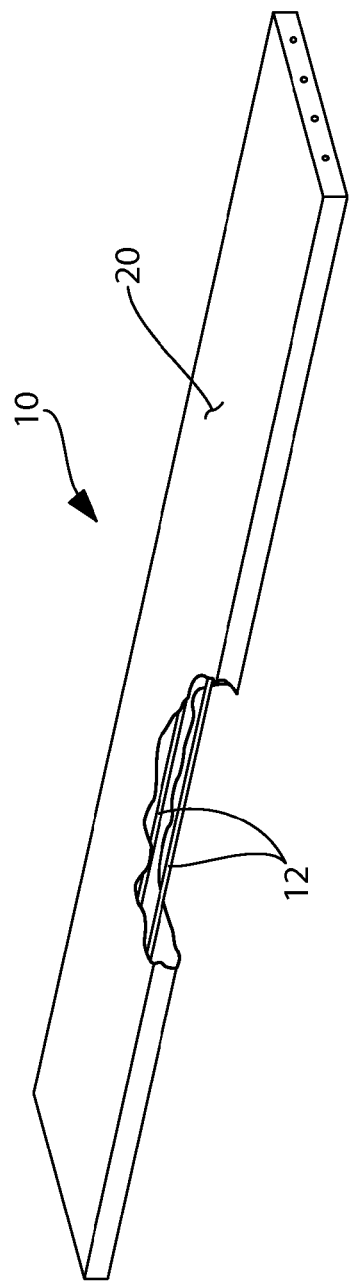
FIG. 1 is a partially fragmented perspective view of an exemplary embodiment of a segment of building material made in accordance with the present invention.

Referring to FIG. 1, a decking plank 10 is shown in accordance with the present invention. The decking plank 10 contains internal reinforcement elements 12 around which is molded a cured synthetic composition 20. Once the cured synthetic composition 20 is cured, the resulting decking plank 10 has strength and flexibility comparable to that of natural wood.

In order for a piece of synthetic lumber to mimic natural wood, it must have a compressive strength of at least 3,000 PSI and a density under 80 pounds per cubic foot. Furthermore, a piece of synthetic lumber must have a wood-like ability to bend. In the present invention, the internal reinforcement elements 12 provide both strength and rigidity to the decking plank 10. However, in order for the internal reinforcement elements 12 to have effect, they must experience some of the loading applied to the decking plank 10. In order for the internal reinforcement elements 12 to help bear the load, the cured synthetic composition 20 must be flexible enough to allow stresses to influence the internal reinforcement elements 12. However, the cured synthetic composition 20 must not crack or otherwise break as it flexes. It is, therefore, important that the cured synthetic composition 20 be somewhat flexible. However, the window of proper flexibility is small. If the cured synthetic composition 20 is made too rigid, the cured synthetic composition 20 will crack when stressed. If the cured synthetic composition 20 is made too flexible, the internal reinforcement elements 12 will have to bear all loading and the synthetic lumber would have strength much lower than that of natural wood. What is required is a cured synthetic composition 20 that has a compressive strength of about 3000 PSI and yet embodies a modulus of elasticity and a modulus of rupture comparable to natural wood.

Figure 2:
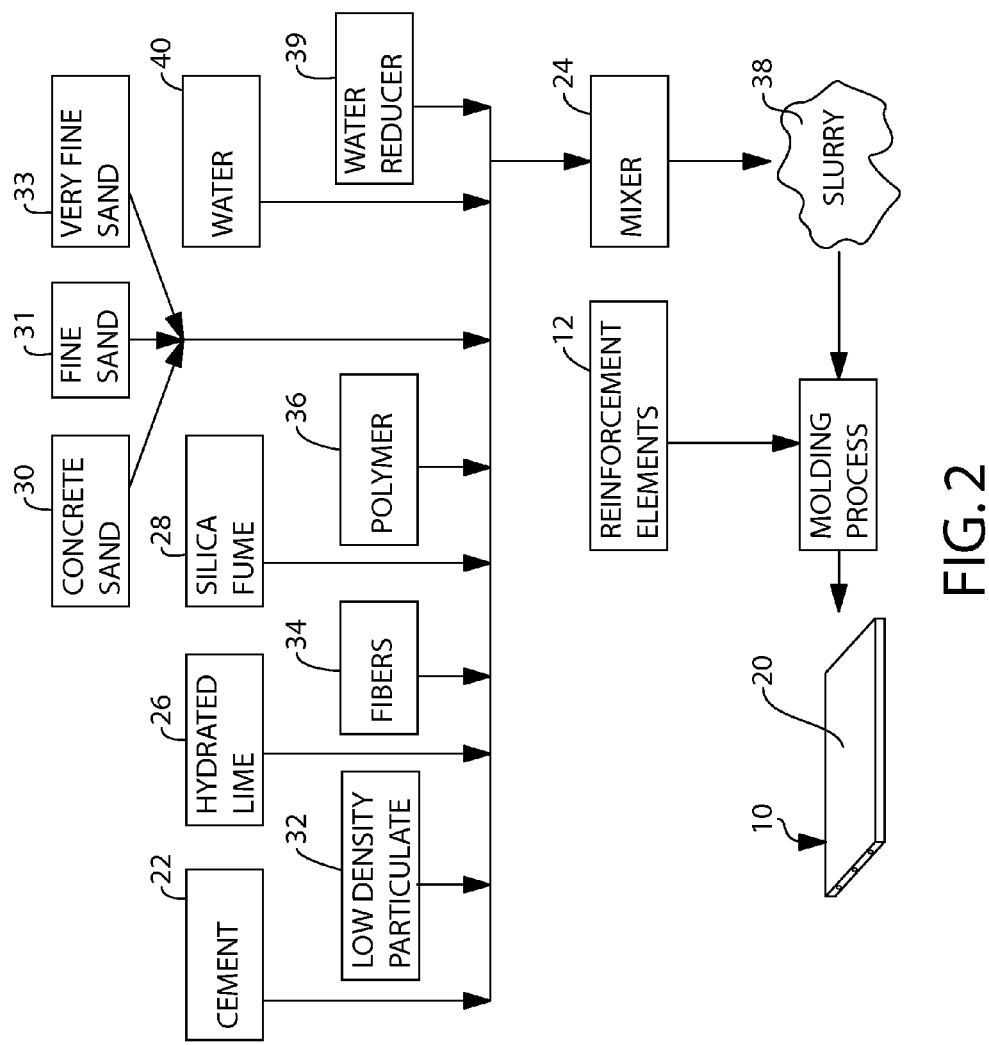
FIG. 2 is a block diagram schematic that illustrates the composition and method of manufacture for building material in accordance with the present invention.

Referring to FIG. 2, details on the cured synthetic composition 20 are presented. The cured synthetic composition 20 is comprised primarily of cement. The cement 22 can be type "1", type "2" and/or type "3" cement. Other variations of cement products such as type "K" may also be used. The cement 22 is added into a mixer 24 in amounts between 550 and 650 pounds per cubic yard. To help the cement 22 cure, hydrated lime 26, silica fume 28, ground slag 29, and sand are added to the mixer 24. The sand is a blend of concrete sand 30, fine sand 31 and very fine sand 33. Hydrated lime 26 is added in amounts approximately 80 pounds per cubic yard. The silica fume 28 is added in amounts between 40 and 50 pounds per cubic yard. The ground slag 29 is added in amounts between 160 and 200 pounds per cubic yard. Concrete sand 30 is added at a concentration of between 300 and 500 pounds per cubic yard. Fine sand 31 is added between 400 and 600 pounds per cubic yard. Lastly, the very fine sand 33 is added between 20 and 30 pounds per cubic yard.

To decrease the density of the mix, a low density particulate 32, such as perlite and/or vermiculite are added to the mixture. The low density particulates 32 are added in amounts between 75 and 125 pounds per cubic yard of the mixture. The purpose of the low density particulate 32 is to decrease the density of the cured synthetic composition 20 so that it cures with a density close to that of wood.

To increase the flexibility of the cured synthetic composition 20, reinforcement fibers 34 are added. The reinforcement fibers 34 are preferably chopped synthetic fibers, such as those that can be obtained from recycled carpeting, and are added in amounts from 5 to 10 pounds per cubic yard. Recycled carpeting has an average composition of 45% Nylon fibers, 10% polypropylene, 9% styrene-butadiene polymer and 26% calcium carbonate. Chopped recycled carpeting typically contains fibers that range from 0.1 mm to 5 mm in length. Although recycled chopped carpeting is preferred, synthetic and other reinforcing fibers from other sources can also be used. A method of obtaining such chopped reinforcement fibers is described in co-pending patent application Ser. No. 11/188,522 to Paul Bracegirdle, entitled Process For Producing And Using Fibers From Waste Carpet, the disclosure of which is incorporated into this application by reference.

An air curable polymer 36, such as an SBR latex emulsion, and an anti-foaming agent 37, are used to help bind the reinforcement fibers 34 to the other ingredients and to seal the synthetic composition. The air curable polymer 36 is added in amounts between 3 and 5 pounds per cubic yard and the anti-foaming agent 37 is added in amounts between 0.3 and 0.5 pounds per cubic yard.

Water 40 is added to the mixture to produce moldable uncured slurry 38. Approximately, 300 pounds of water 40 per cubic yard will produce the needed consistency and proper water-cement ratio. A high range water reducer 39, in amounts of approximately 1.5 pounds per 100 pounds of cement, can be added to the mixture to ensure more even mixing and proper flow.

Once all the ingredients are added into the mixer 24, the uncured slurry 38 is mixed to the proper consistency. Prior to the uncured slurry 38 being directed into a mold, the internal reinforcement elements 12 are placed within the mold. The internal reinforcement elements 12 can be metal wire or metal bar. However, it is preferred that the internal reinforcement elements 12 be braided stands of fiberglass, carbon fiber or other synthetic tensile reinforcement. In this manner, metal cutting tools need not be required to cut and shape the final product.

Depending upon the amount of water 40 or high range water reducer 39 used in the uncured slurry 38, the uncured slurry 38 can be produced as thin slurry, suitable for cast molding techniques, or a thick paste suitable for extrusion molding techniques. Less water can be added to the slurry 38 to produce a viscosity suitable for dry pack molding. To make long boards, such as the decking plank 10 of FIG. 1, both the reinforcement elements 12 and the uncured slurry 38 can be simultaneously fed through an extrusion molder shaped to create decking planks 10. The decking planks 10 with the internal reinforcement elements 12 can then be cut to length after molding. For larger building elements, such as structural beams, poured moldings are preferred. Reinforcement elements 12 can be placed in different amounts in different areas of an engineered beam depending upon the usage anticipated for that beam.

Regardless of whether the uncured slurry 38 is subject to cast molding, extrusion molding or dry pack molding, the uncured slurry 38 forms a desired shape around the internal reinforcement elements 12. The uncured slurry 38 is then either allowed time to cure or is actively cured. The final result is building materials, such as decking planks 10, made from the cured synthetic composition.

It will be understood that the embodiment of the present invention that is shown is merely exemplary and that a person skilled in the art can make many variations to that embodiment. For instance, the present invention can be made into many other products, such as building and framing lumber, posts, and sheathing, in addition to the decking planks illustrated. Furthermore, additives, such as colorants, mold inhibitors and the like can also be added to the disclosed compositions. Moreover, other methods of similar composition manufacturing techniques, such as dry-pack methods, flatbed pre-casting and sawn in-place products may be employed. All such variations, modifications and alternate embodiments are intended to be included within the scope of the present invention as defined by the claims.

What is claimed is:

1. A method of fabricating artificial lumber that has a compressive strength of at least 3000 pounds per square inch and a density under eighty pounds per cubic foot so as to better mimic natural wood lumber, said method comprising the steps of:

providing a synthetic composition containing a mixture of cement, sand, curing agents, water, synthetic fibers, a low density particulate and a curable polymer, wherein said cement is provided in amounts between 550 and 650 pounds per cubic yard, said synthetic fibers are added in amounts between 5 and 10 pounds per cubic yard, said low density particulate is added in amounts between 75 and 125 pounds per cubic yard, and said curable polymer is added in amounts between 3 and five pounds per cubic yard;

providing reinforcement elements; and molding said synthetic composition around said reinforcement elements, wherein said synthetic composition cures and forms a segment of artificial lumber internally reinforced by said reinforcement elements.

2. The method of claim 1, wherein said synthetic fibers include recycled carpet fibers.

3. The method of claim 1, wherein said sand is a blend of concrete sand, fine sand and very fine sand.

4. The method according to claim 3, wherein said concrete sand is present in a range of 300 to 500 pounds per cubic yard of said synthetic composition, said fine sand is present in a range of 450 to 600 pounds per cubic yard of said synthetic composition, and said very fine sand is present in a range of 20 to 30 pounds per cubic yard of said synthetic composition.

5. The method according to claim 1, wherein said low density particulate is selected from a group consisting of perlite and vermiculite.

6. The method according to claim 1, wherein said curing agents include hydrated lime, silica fume and ground slag.

7. The method according to claim 6, wherein said silica fume is present in a range between 40 and 50 pounds per cubic yard of said synthetic composition.

8. The method according to claim 6, wherein said ground slag is present in a range of between 160 and 200 pounds per cubic yard of said synthetic composition.

9. The method according to claim 1, wherein said water is present in a range between 200 and 400 pounds per cubic yard of said synthetic composition.

10. The method according to claim 1 further including adding a water reducer to said synthetic composition.

11. The method according to claim 1, further including adding an anti-foaming agent to said synthetic composition.

12. The method according to claim 1, wherein reinforcement elements are selected from a group consisting of fiberglass elements and carbon fiber elements.

13. The method according to claim 1, wherein said step of molding said synthetic composition around said reinforcement elements includes pouring said synthetic composition around said reinforcement elements in a mold.

14. A method of fabricating synthetic building components, comprising the steps of:

mixing cement, sand, curing agents, water, synthetic fibers, and a low density particulate to create a synthetic composition that cures in time, wherein said cement is provided in amounts between 550 and 650 pounds per cubic yard, said synthetic fibers are added in amounts between 5 and 10 pounds per cubic yard, said low density particulate is added in amounts between 75 and 125 pounds per cubic yard, and said curable polymer is added in amounts between three and five pounds per cubic yard;

molding said synthetic composition into a building component; and enabling said synthetic composition to cure.

15. The method according to claim 14, further including the step of internally reinforcing said building component with reinforcement elements.

16. The method of claim 14, wherein said synthetic fibers include recycled carpet fibers.

17. The method of claim 14, wherein said sand is a blend of concrete sand, fine sand and very fine sand.

18. The method according to claim 14, further including adding a curable polymer and a water reducer to said synthetic composition.

19. The method according to claim 14, wherein said curing agents include hydrated lime, silica fume and ground slag.

* * * * *